US012653148B2

(12) United States Patent (10) Patent No.: US 12,653,148 B2
Mann (45) Date of Patent: Jun. 16, 2026

(54) DEVICE AND METHOD FOR DEFLECTING A CONVEYOR CHAIN AND ANIMAL FEED TRANSPORT SYSTEM

(71) Applicant: BIG DUTCHMAN INTERNATIONAL GMBH, Vechta (DE)

(72) Inventor: Leon Mann, Vechta (DE)

(73) Assignee: BIG DUTCHMAN INTERNATIONAL GmbH, Vechta (DE)

( * ) Notice: Subject to any disclaimer, the term of this patent is extended or adjusted under 35 U.S.C. 154(b) by 58 days.

(21) Appl. No.: 18/733,106

(22) Filed: Jun. 4, 2024

(65) Prior Publication Data

US 2024/0407329 A1 Dec. 12, 2024

(30) Foreign Application Priority Data

Jun. 8, 2023 (LU) ........................................ 504453

(51) Int. Cl.
*A01K 5/02* (2006.01)
*B65G 19/08* (2006.01)
(52) U.S. Cl.
CPC .................................. *A01K 5/0208* (2013.01)
(58) Field of Classification Search
None
See application file for complete search history.

(56) References Cited

U.S. PATENT DOCUMENTS 2,672,059 A 3/1954 Graetz et al.
3,147,853 A * 9/1964 Van Huis ............... A01K 39/01
403/258

(Continued)

FOREIGN PATENT DOCUMENTS

DE 1193423 5/1965
DE 1193423 B * 5/1965
(Continued)

OTHER PUBLICATIONS

Big Dutchman, "EuroTier digital 2021: Chain feeding in parent stock farming: detailed improvement and new components," (Jan. 23, 2021), pp. 1-2.

(Continued)

*Primary Examiner* — Gene O Crawford
*Assistant Examiner* — Muhammad Awais
(74) *Attorney, Agent, or Firm* — PRICE HENEVELD LLP

(57) ABSTRACT

A device for deflecting a conveyor chain for transporting animal feed and an animal feed transport system for transporting animal feed includes a housing with a first housing opening and a second housing opening, and a deflection wheel. The deflection wheel is arranged within the housing between the first housing opening and the second housing opening, and is mounted rotatably about a vertical axis of rotation. The deflection wheel has a first conveyor chain guide element which extends radially outwards from an outer circumference of the deflection wheel, wherein the first conveyor chain guide element has a first conveyor chain guide section. The deflection wheel further comprises a second conveyor chain guide element which extends radially outwards from the outer circumference of the deflection wheel, wherein the second conveyor chain guide element comprises a second conveyor chain guide section.

20 Claims, 12 Drawing Sheets

(56)             References Cited

U.S. PATENT DOCUMENTS

| | | | | |
|---|---|---|---|---|
| 3,444,986 A | | 5/1969 | Van Huis | |
| 4,327,828 A | * | 5/1982 | Williams ............... | B65G 19/22 |
| | | | | 119/57.2 |
| 11,254,509 B2 | * | 2/2022 | Gerhardt-Hansen .. | B65G 23/34 |
| 2009/0008223 A1 | * | 1/2009 | Fujii .................... | A01K 5/0208 |
| | | | | 198/813 |

FOREIGN PATENT DOCUMENTS

| | | | | | |
|---|---|---|---|---|---|
| DE | 10022003 | | 11/2001 | | |
| DE | 10022003 A1 | * | 11/2001 | ............. | A01K 39/01 |
| TW | M460526 | * | 9/2013 | | |

OTHER PUBLICATIONS

Big Dutchman, "Automatic chain feeding for modern poultry farming," (Dec. 31, 2015), pp. 1-4.
Georgia Poultry Equipment Co., "Poultry Feed Systems," (May 31, 2023), pp. 1-16.

* cited by examiner

10

20

25

21a

22a

28

62

61

A:

200

210

220

230

240

DEVICE AND METHOD FOR DEFLECTING A CONVEYOR CHAIN AND ANIMAL FEED TRANSPORT SYSTEM

CROSS-REFERENCE TO FOREIGN PRIORITY APPLICATION

The present application claims the benefit under 35 U.S.C. §§ 119(b), 119(e), 120, and/or 365(c) of Luxembourg Application No. LU504453 filed Jun. 8, 2023.

FIELD OF THE INVENTION

The invention relates to a device for deflecting a conveyor chain for transporting animal feed. The invention also relates to an animal feed transport system for transporting animal feed and a method for deflecting a conveyor chain, in particular for transporting animal feed. Furthermore, the invention relates to a use of such a device and/or such an animal feed transport system.

BACKGROUND OF THE INVENTION

In the field of livestock breeding, it is known to use automated feed conveying systems by means of which animal feed can be automatically conveyed along animals in such a way that these animals have access to the animal feed. A so-called automated chain feeding is typically used in the breeding and keeping of breeding animals, for example in poultry farming.

Automated chain feeding typically involves a conveyor chain that is driven by a drive unit. A conveyor chain comprising several interconnected chain links is known, for example, from U.S. Pat. No. 2,672,059 A. The conveyor chain is typically guided through a feed container in which animal feed is located, so that the conveyor chain removes animal feed from the feed container when it moves through the feed container. The conveyor chain is then used to move the animal feed along feed troughs through the animal housing area, i.e., in particular through a barn in which the animals to be fed are located. The animals can then remove the animal feed from the feed troughs. The conveyor chain, which is usually endless, typically moves around a closed track, which is usually essentially rectangular. For this purpose, the conveyor chain is usually deflected at several positions.

The conveyor chain is deflected by means of devices for deflecting the conveyor chain, which can also be referred to as feed corners. In a typical arrangement, the conveyor chain is deflected through 90° by means of four such devices, i.e., at four different positions. Such devices for deflecting the conveyor chain are known, for example, from U.S. Pat. Nos. 3,147,853 A, 3,444,986 A and 4,327,828 A.

One problem that occurs with known devices for deflecting conveyor chains is that the base plate and/or the conveyor chain wear out within a relatively short time due to a relative movement between the conveyor chain and the base plate of the device and due to the forces acting between the conveyor chain and the base plate. It can then happen that the conveyor chain eats into the base plate of the device housing after some operating time. Due to the resulting wear of the base plate and/or the conveyor chain, the device and the conveyor chain only have a relatively short service life, so that the housing must be regularly repaired or at least partially replaced and the conveyor chain may also have to be regularly repaired. In particular, worn parts typically need to be replaced after some time. The higher the conveying speed of the conveyor chain, the faster such undesirable wear occurs.

A further problem that occurs with known devices for deflecting conveyor chains is that relatively high wear also occurs on a guide rail provided in the housing, as the conveyor chain is moved along this guide rail attached to the housing and the guide rail and/or the conveyor chain wear due to the relative movement and the forces acting between the conveyor chain and the guide rail.

In the past, particularly wear-resistant materials were used to increase the service life of devices for deflecting conveyor chains. Although this can reduce wear somewhat, it also increases the material costs for the device.

The invention is therefore based on the task of providing an improved solution that addresses the aforementioned problems. In particular, it is the task of the invention to provide a solution that increases the service life of a device for deflecting a conveyor chain.

SUMMARY OF THE INVENTION

According to a first aspect, the problem is solved by a device disclosed herein. According to this, a device for deflecting, in particular for deflecting by 90° or 135°, a conveyor chain for transporting animal feed is provided, the device comprising a housing with a first housing opening and a second housing opening, and a deflection wheel for guiding and deflecting a conveyor chain from the first housing opening of the housing to the second housing opening of the housing, wherein the deflection wheel is arranged within the housing between the first housing opening and the second housing opening, and wherein the deflection wheel is mounted rotatably about a, preferably vertical, axis of rotation.

According to the invention, it is provided that the deflection wheel has a first conveyor chain guide element which extends radially outwards from an outer circumference of the deflection wheel, wherein the first conveyor chain guide element has a first conveyor chain guide section, and the deflection wheel has a second conveyor chain guide element which extends radially outwards from the outer circumference of the deflection wheel, wherein the second conveyor chain guide element has a second conveyor chain guide section.

Accordingly, it is provided that the deflection wheel comprises two conveyor chain guide elements which extend outwards in a radial direction and which each have a conveyor chain guide section, so that a conveyor chain can be accommodated between these conveyor chain guide sections, thereby enabling the conveyor chain to be guided within the device exclusively by means of the conveyor chain guide elements.

The device is in particular designed to deflect a conveyor chain, preferably by 90° or 135°. The conveyor chain to be deflected by the device is preferably endless and designed in particular for transporting animal feed.

The first housing opening is preferably formed by a first housing opening section. The first housing opening is preferably designed to guide a conveyor chain through the first housing opening. The second housing opening is preferably formed by a second housing opening section. The second housing opening is preferably designed to guide a conveyor chain through the second housing opening.

The deflection wheel, which can also be referred to as a chain wheel, is preferably designed to guide and deflect a conveyor chain from the first housing opening of the housing to the second housing opening of the housing. The deflection wheel is preferably connected to the housing, in particular detachably, and is mounted on the housing so that it can rotate about the axis of rotation. The deflection wheel is preferably rotationally symmetrical about the axis of rotation.

The deflection wheel is arranged between the first housing opening and the second housing opening within the housing, wherein preferably the distance between the first housing opening and the deflection wheel and the distance between the second housing opening and the deflection wheel is the same. In particular, the device can be designed to be mirror-symmetrical with respect to a mirror plane in which the axis of rotation lies.

The first conveyor chain guide element and the second conveyor chain guide element extend radially outwards from an outer circumference of the deflection wheel. The outer circumference of the deflection wheel is in particular to be understood as a circumferential, outer section of the deflection wheel, from which the first and the second conveyor chain guide element extend even further radially outwards. Such a radially outward extension means, in particular, that the first conveyor chain guide element and the second conveyor chain guide element extend at least partially radially outward.

The first conveyor chain guide section and the second conveyor chain guide section are preferably arranged and designed to guide the conveyor chain on different sections of the conveyor chain, so that the conveyor chain can preferably be arranged at least in sections between the first conveyor chain guide section and the second conveyor chain guide section. The first conveyor chain guide element is preferably formed integral with the deflection wheel, i.e., in particular as an integral component of the deflection wheel. The second conveyor chain guide element is preferably formed integrally with the deflection wheel, i.e., in particular as an integral component of the deflection wheel.

The first conveyor chain guide element has a first conveyor chain guide section. The first conveyor chain guide section is preferably designed to guide an upper and/or radially outer section of the conveyor chain. Thus, preferably, the radially outer side surface and/or the upper side of the conveyor chain can be guided by means of the first conveyor chain guide section.

The second conveyor chain guide element has a second conveyor chain guide section. The second conveyor chain guide section is preferably designed to guide a lower and/or radially inner section of the conveyor chain. Thus, preferably, the radially inner side surface and/or the underside of the conveyor chain can be guided by means of the second conveyor chain guide section.

An advantage of such a device is that a conveyor chain can be guided and deflected exclusively by means of the deflection wheel due to the first conveyor chain guide element and the second conveyor chain guide element. A conveyor chain can therefore be guided and deflected in particular by means of a frictional connection with the deflection wheel exclusively by means of the deflection wheel, in particular by means of the conveyor chain guide elements. Due to the frictional connection between the deflection wheel and the conveyor chain, there is no or only very little relative movement between the conveyor chain and the parts of the deflection wheel in contact with the conveyor chain.

Using such a device, a conveyor chain can therefore be guided and deflected exclusively by means of the deflection wheel in such a way that the conveyor chain can run through the housing without coming into contact with the base plate. Friction due to relative movement between the conveyor chain and the base plate can therefore be avoided. Therefore, wear of the base plate and/or the conveyor chain due to friction between the base plate and the conveyor chain can also be avoided in a particularly advantageous way. Due to the reduced wear, the service life of the device can thus be significantly increased.

A further advantage is that no chain guide rail is required on the inner surface of the housing body. Due to the possibility of guiding and deflecting the conveyor chain exclusively by means of the deflection wheel, the use of a chain guide rail arranged in the housing and/or connected to the housing can be dispensed with. Friction due to a relative movement between the conveyor chain and the chain guide rail, as occurs with known devices, can thus be avoided. Therefore, wear of the chain guide rail and/or the conveyor chain due to friction between the chain guide rail and the conveyor chain can be avoided in a particularly advantageous manner. Due to the reduced wear, the service life of the device can be significantly increased. Since no chain guide rail is required, the manufacturing costs for the device can also be reduced.

A further advantage is that by avoiding friction between the conveyor chain and the base plate and avoiding friction between the conveyor chain and the chain guide rail, the housing and/or the base plate do not have to be made of a wear-resistant material. For example, the housing can be made of plastic, which can significantly reduce the material costs of the device.

According to a particularly preferred embodiment, it is provided that the first housing opening and the second housing opening are arranged rotated relative to each other with respect to the axis of rotation, preferably rotated relative to each other by at least 75° and at most 150°, in particular by 90° or 135°, with respect to the axis of rotation.

The first housing opening and the second housing opening are preferably oriented in different directions, and preferably rotated relative to a vertical axis by at least 80° and at most 145°, in particular by 90° or 135°. This allows the conveyor chain to be guided into the housing in a first direction and out of the housing in a second, different direction, in particular a direction differing by 90° or 135°.

It is particularly preferred that the first conveyor chain guide element and the second conveyor chain guide element are arranged distanced from one another in the direction of the axis of rotation, wherein the distance in the vertical direction between the lower side of the first conveyor chain guide element and the upper side of the second conveyor chain guide element is preferably at least 22 mm, particularly preferably at least 18 mm, in particular 14.3 mm.

By means of such a distance, improved guidance of the conveyor chain along the deflection wheel can be achieved. Furthermore, depending on the distance and the dimensions of the conveyor chain, such a distance can make it possible to arrange the conveyor chain at a slight angle between the first conveyor chain guide element and the second conveyor chain guide element.

It is particularly preferred that the first conveyor chain guide element extends radially outwards from the outer circumference of the deflection wheel parallel to a radial direction which is aligned orthogonally to the axis of rotation. Preferably, the first conveyor chain guide element extends essentially in a horizontal direction radially outwards.

It is particularly preferred that the second conveyor chain guide element extends radially outwards from the outer circumference of the deflection wheel parallel to a radial direction which is aligned orthogonally to the axis of rotation. Preferably, the second conveyor chain guide element extends essentially in a horizontal direction radially outwards.

Preferably, the first and second conveyor chain guide elements extend radially outwards parallel to each other, in particular radially outwards in a horizontal direction.

It is particularly preferred that the first conveyor chain guide section is arranged on an underside of the first conveyor chain guide element. This makes it possible to achieve in a particularly advantageous manner that a conveyor chain is guided from above by means of the first conveyor chain guide section, and the first conveyor chain guide section is arranged above the conveyor chain.

It is particularly preferred that the second conveyor chain guide section is arranged on an upper side of the second conveyor chain guide element. This makes it possible to achieve in a particularly advantageous manner that a conveyor chain is guided from below by means of the second conveyor chain guide section, and the second conveyor chain guide section is arranged below the conveyor chain.

Preferably, the first conveyor chain guide section and second conveyor chain guide section are arranged at least 22 mm, preferably at least 18 mm, in particular 14.3 mm, apart from each other in the vertical direction.

It is particularly preferred that the first conveyor chain guide section and the second conveyor chain guide section are arranged facing each other.

It is particularly preferred that the first conveyor chain guide element extends further radially outwards than the second conveyor chain guide element. By means of such an arrangement, the first conveyor chain guide element and the second conveyor chain guide element can be optimally adapted to guide a conveyor chain. In this way, the first conveyor chain guide element can guide a section of a conveyor chain that is radially further outwards and the second conveyor chain guide element can guide a section of the conveyor chain that is radially further inwards.

It is particularly preferred that the extension of the first conveyor chain guide element in the radially outward direction is many times greater, preferably at least four times greater, particularly preferably at least eight times greater, in particular at least twelve times greater, than the extension of the second conveyor chain guide element in the radially outward direction.

It is particularly preferred that the extension of the first conveyor chain guide element in the radially outward direction is at least 34 mm and/or at most 50 mm.

It is particularly preferred that the extension of the second conveyor chain guide element in the radially outward direction is at least 3 mm and/or at most 8 mm.

If the first conveyor chain guide element extends significantly further radially outwards than the second conveyor chain guide element, a conveyor chain can be arranged in a particularly advantageous manner between the first and second conveyor chain guide elements in such a way that the conveyor chain is guided by means of the first and second conveyor chain guide elements and at the same time a free space is arranged below the conveyor chain, along which no conveyor chain guide element extends, so that the conveyor chain can transport the animal feed through the housing without being obstructed by the second conveyor chain guide element.

Furthermore, in such an embodiment, the first and second conveyor chain guide elements are preferably only designed to extend radially outwards in such a way that the first and second conveyor chain elements can each perform their guide function.

It is particularly preferred that the first conveyor chain guide section and the second conveyor chain guide section are formed and arranged to receive a conveyor chain between the first conveyor chain guide section and the second conveyor chain guide section.

It is particularly preferred that no chain guide rail is arranged on the inner surface of the housing body. This is a particularly advantageous way of avoiding friction due to relative movement between the conveyor chain and the chain guide rail, as occurs with known devices.

It is particularly preferred that the housing has a housing body, wherein preferably the housing body comprises or consists of plastic, in particular thermoplastic polymer, wherein the housing body is preferably designed as a plastic injection-molded component.

Such a design of the housing body as a plastic housing is particularly advantageous in combination with the guidance of a conveyor chain exclusively by means of the deflection wheel. This is because there is preferably no contact and therefore no friction between the conveyor chain and the housing. This makes it possible to use a material that is significantly less wear-resistant than steel, such as plastic, for the housing body. By using plastic for the housing body, the material costs for the housing body can be significantly reduced. In addition, the weight of the device can be significantly reduced, making transportation and handling easier.

Preferably, the housing has a base plate, preferably detachably connected to the housing body, which preferably comprises or consists of steel.

The housing body and the base plates can preferably be made of different materials. However, the same material can also be selected for the housing body and the base plate. The base plate is preferably detachably connected to the housing body, in particular by means of a screw connection.

It is particularly preferred that the base plate comprises or consists of steel with a Brinell tungsten carbide hardness according to EN ISO 6506-1 of less than 400 HBW (Brinell tungsten carbide hardness), preferably less than 300 HBW, particularly preferably less than 200 HBW.

Such a design of the base plate as a steel component with a hardness that is relatively low compared to the steel usually used for such base plates is particularly advantageous in combination with the guidance of a conveyor chain exclusively by means of the deflection wheel. This is because there is preferably no contact and therefore no friction between the conveyor chain and the base plate. This makes it possible to use a steel with a relatively low hardness without the base plate wearing out relatively quickly. By using such a steel for the base plate, the material costs for the base plate can be significantly reduced.

It is particularly preferred that the housing in the region of the first housing opening has at least one feed trough guide element, in particular formed integrally with the housing body, for guiding a feed trough, wherein the housing in the region of the first housing opening preferably has two feed trough guide elements, in particular formed integrally with the housing body, for guiding a feed trough. The at least one feed trough guide element preferably extends in a direction in which a feed trough can be inserted in the region of the housing opening.

It is particularly preferred that the housing in the region of the second housing opening has at least one feed trough guide element, preferably formed integrally with the housing body, for guiding a feed trough, wherein the housing in the region of the second housing opening preferably has two feed trough guide elements, in particular formed integrally with the housing body, for guiding a feed trough. The at least one feed trough guide element preferably extends in a direction in which a feed trough can be inserted in the region of the housing opening.

An advantage of such at least one feed trough guide element is that it can be formed integrally with the housing body. This is particularly easy to implement if the housing body comprises or consists of plastic. With such integrally formed feed trough guide elements, it is not necessary to attach an additional component to the housing to guide the feed troughs.

A further advantage of such feeding trough guide elements is that the feeding troughs cannot deform or can only deform slightly, as the feeding troughs can be pushed into the housing body and then fit into the housing body in such a way that deformation by the feeding trough guide elements is prevented.

It is particularly preferred that the at least one feed trough guide element arranged in the region of the first housing opening is designed as at least one projection projecting into the first housing opening, preferably with an L-shaped cross-section. In particular, the projection can have a cross section in the form of an angled profile, for example an isosceles angled profile with two sections arranged at 90° to each other.

It is particularly preferred that the at least one feed trough guide element arranged in the region of the second housing opening is designed as at least one projection projecting into the second housing opening, preferably with an L-shaped cross section. In particular, the projection can have a cross section in the form of an angled profile, for example an isosceles angled profile with two sections arranged at 90° to each other.

It is particularly preferred that the device comprises a device holding arrangement, comprising at least one, preferably two, stands, and preferably a foot element connected to the at least one stand, and at least one, preferably two, wire brackets, which is connected to the housing and is designed to fix the device to the at least one stand of the device holding arrangement.

By means of such a device holding arrangement, the device can be adjusted in height, i.e., in the vertical direction, in a particularly simple way.

According to a further aspect, the task mentioned at the beginning is solved by an animal feed transport system for transporting animal feed, comprising at least one device as described herein, preferably several, in particular four, devices as described herein, a conveyor chain, preferably comprising a plurality of interconnected chain links, wherein the conveyor chain extends through the at least one device.

Preferably, the conveyor chain is arranged at least in sections between the first conveyor chain element and the second conveyor chain element, and in particular between the first conveyor chain guide section and the second conveyor chain guide section.

It is particularly preferred that the animal feed transport system comprises at least one feed trough, preferably in the form of a U-profile, which is preferably connected to the at least one device.

Preferably, a feeding trough is arranged both in the area of the first housing opening and in the area of the second housing opening and connected to the housing of the device.

Preferably, a feeding grill is arranged inside the feeding trough. This allows hens and cockerels to be fed separately.

It is particularly preferred that the animal feed transport system comprises a drive unit, preferably an electric drive unit, for driving the conveyor chain, the drive unit is preferably designed to move the conveyor chain at a speed of at least 10 m/min, preferably at least 12 m/min, and at a speed of at most 40 m/min, preferably at most 38 m/min. Preferably, the drive unit is designed to move the conveyor chain at a speed in the range of 12 m/min to 18 m/min or at a speed of 36 m/min.

The drive unit is preferably coupled to the conveyor chain to drive the conveyor chain. The drive unit preferably has a gear wheel, whereby the conveyor chain can be driven by means of the gear wheel driven by the drive unit. In particular, the drive unit can be designed as an electrically driven geared motor.

It is particularly preferred that the animal feed transport system comprises at least one chain tensioning device, preferably several, in particular two, chain tensioning devices, for tensioning the conveyor chain.

The conveyor chain can be tensioned by means of the chain tensioning device so that the conveyor chain can circulate in an animal feed transport system. The chain tensioning device is designed in particular to move two feed troughs connected to the chain tensioning device away from each other, i.e., to push them apart, so that the distance between the feed troughs and thus the distance between the devices increases, thereby tensioning the conveyor chain. In this way, a pre-tension can be applied to the conveyor chain by means of the chain tensioning device.

Preferably, the animal feed transport system has two chain tensioning devices that are arranged on feed troughs parallel to each other.

It is particularly preferred that the animal feed transport system comprises a feed container, wherein the conveyor chain for receiving animal feed from the feed container extends through the feed container.

Such a feed container is therefore used to supply animal feed. The feed container preferably has two openings into which a feed trough can be fed in or out. The conveyor chain then preferably runs through the feed container filled with animal feed and transports the animal feed to the animals.

It is particularly preferred that the at least one feeding trough is directly connected, preferably detachably, to the housing.

Preferably, the at least one feeding trough can be pushed into the housing in a region of the first housing opening and/or the second housing opening.

According to a further aspect, the task mentioned at the beginning is solved by a method for deflecting a conveyor chain, in particular for transporting animal feed, the method comprising the steps of: providing a device for deflecting a conveyor chain, preferably a device as described herein, the device comprising a housing with a first housing opening and a second housing opening, and a deflection wheel, wherein the deflection wheel is arranged within the housing between the first housing opening and the second housing opening, and wherein the deflection wheel is mounted rotatably about a, preferably vertical, axis of rotation, wherein the deflection wheel has a first conveyor chain guide element which has a first conveyor chain guide section, and wherein the deflection wheel has a second conveyor chain guide element which has a second conveyor chain guide section, arranging a conveyor chain, preferably comprising a plurality of interconnected chain links, so that the conveyor chain extends from the first housing opening to the second housing opening, wherein the conveyor chain is arranged along the deflection wheel at least in sections between the first conveyor chain element and the second conveyor chain element, and in particular between the first conveyor chain guide section and the second conveyor chain guide section.

Preferably, the method comprises moving the conveyor chain by means of a drive unit at a speed of at least 10 m/min, preferably at least 12 m/min, and at most 40 m/min, preferably at most 38 m/min. Preferably, the conveyor chain is moved at a speed in the range from 12 m/min to 18 m/min or at a speed of 36 m/min.

Preferably, the method also includes stopping the conveyor chain by stopping the drive unit. Preferably, the conveyor chain is moved and stopped alternately on a continuous basis.

Preferably, the conveyor chain is moved for a maximum of 75 minutes per day, preferably for a maximum of 20 minutes per day, particularly preferably for a maximum of 15 minutes per day, and is stopped for the remaining time per day.

It is particularly preferred that the conveyor chain is only in direct contact with the deflection wheel when the conveyor chain is moved through the device within the device and is not in direct contact with other parts of the device.

Preferably, therefore, the conveyor chain touches the deflection wheel during operation, but not the housing and not the housing body of the housing and also not the base plate of the housing.

According to a further aspect, the task mentioned at the beginning is solved by a use of a device as described herein and/or an animal feed transport system as described herein in a barn for breeding animals, in particular in a poultry barn, for transporting animal feed in the barn.

With regard to the advantages, embodiment variants and embodiment details of the various aspects of the solutions described herein and their respective possible embodiments, reference is also made to the description of the corresponding features, details and advantages of the respective other aspects and their embodiments.

BRIEF DESCRIPTION OF THE DRAWINGS

Preferred embodiments are explained by way of example with reference to the accompanying Figures. The drawings are not necessarily true to scale. In the Figures, identical or essentially functionally identical or similar elements are designated with the same reference numbers. They show.

DETAILED DESCRIPTION OF THE EMBODIMENTS

Figure 1:
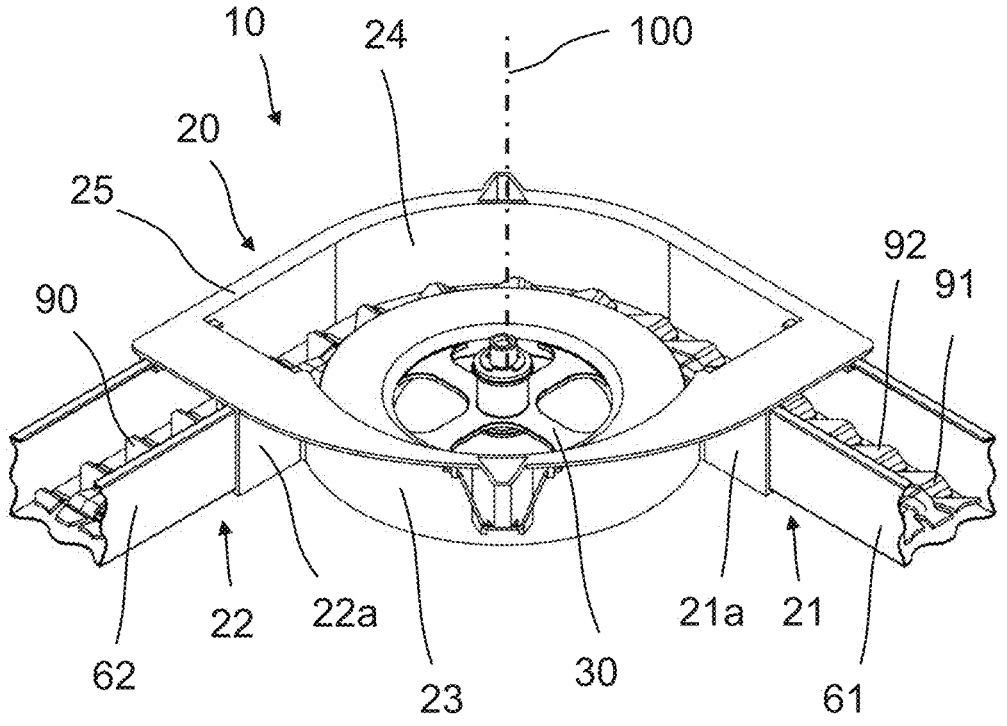
FIG. 1 is a perspective view from inclined above of a device for deflecting a conveyor chain.

FIG. 1 shows a perspective view from inclined above of a device 10 for deflecting a conveyor chain. In the illustration shown here, the device 10 is shown without a cover so that the inside of the device 10 is visible.

The device 10 is used to deflect a conveyor chain 90 by 90°. The conveyor chain 90 is used to transport animal feed. The device 10 comprises a housing 20 with a first housing opening 21 and a second housing opening 22. The first housing opening 21 is formed by a first housing opening section 21*a*. The second housing opening 22 is formed by a second housing opening section 22*a*. In the region of the first housing opening 21*a*, a first feeding trough 61 is arranged and inserted into the housing body 25. In the region of the second housing opening 22*a*, a second feeding trough 62 is arranged and inserted into the housing body 25.

The device 10 comprises a deflection wheel 30 for guiding and deflecting the conveyor chain 90 from the first housing opening 21 of the housing 20 to the second housing opening 22 of the housing 20. The deflection wheel 30 is arranged inside the housing 20 between the first housing opening 21 and the second housing opening 22. The deflection wheel 30 is rotatably mounted about a vertically aligned axis of rotation 100.

The housing 20 has a housing body 25, which is made of a thermoplastic polymer and has been manufactured using a plastic injection molding process. The housing body 25 has an inner surface 24 on which no chain guide rail is arranged. The housing body 25 has a bulge 23 to receiving the deflection wheel 30 in the housing 20 at this position.

The conveyor chain 90 is guided and deflected by the deflection wheel 30 in such a way that the conveyor chain 90 is only in contact with the deflection wheel 30 inside the housing 20 and there is no friction between the conveyor chain 90 and the housing 20. The conveyor chain 90 has a large number of interconnected chain links 91, 92.

Figure 2:
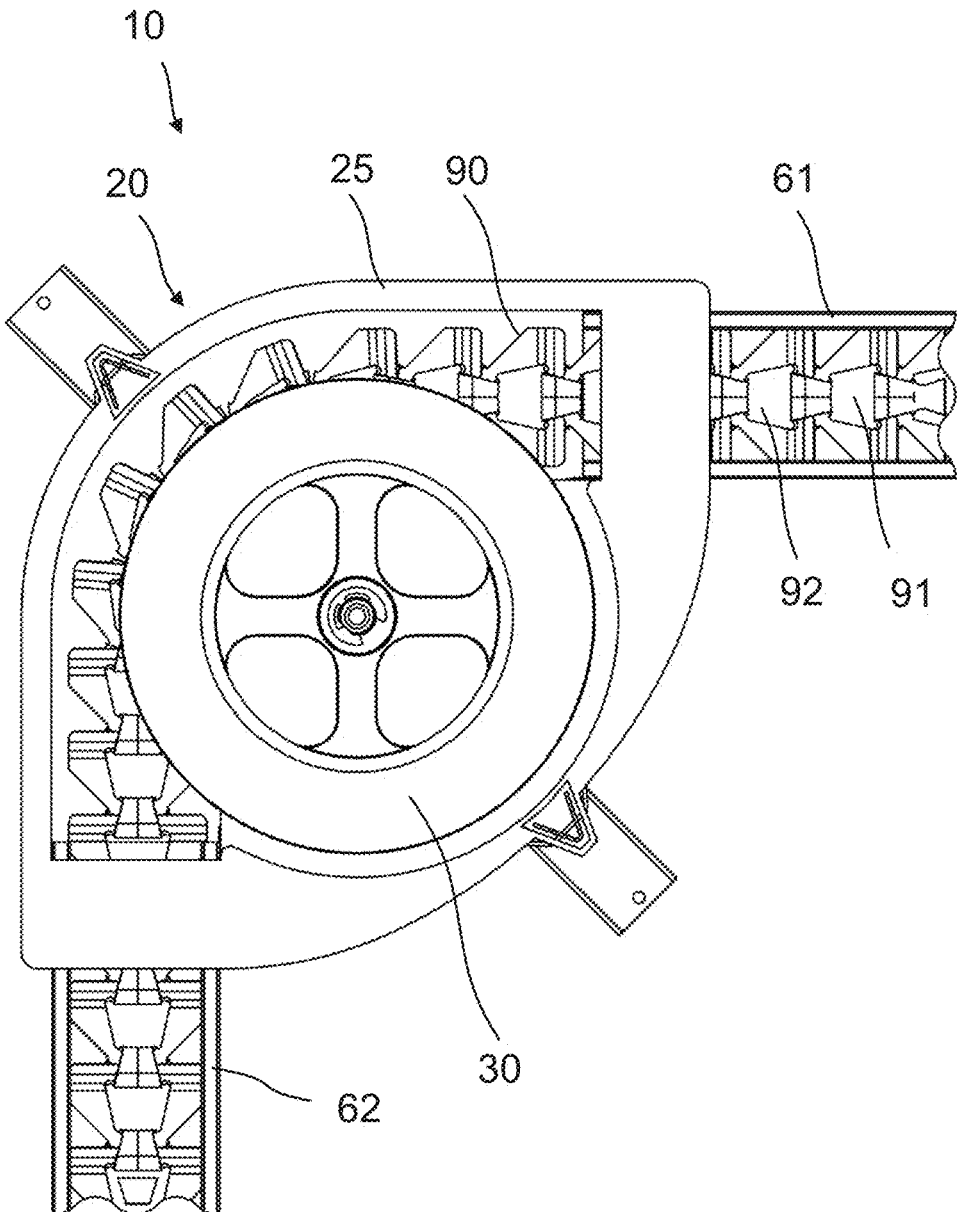
FIG. 2 is a top view of a device for deflecting a conveyor chain.

FIG. 2 shows a top view of the device 10 shown in FIG. 1 for deflecting a conveyor chain 90. In the illustration shown here, the device 10 is also shown without a cover, so that the inside of the device 10 is visible.

Figure 3:
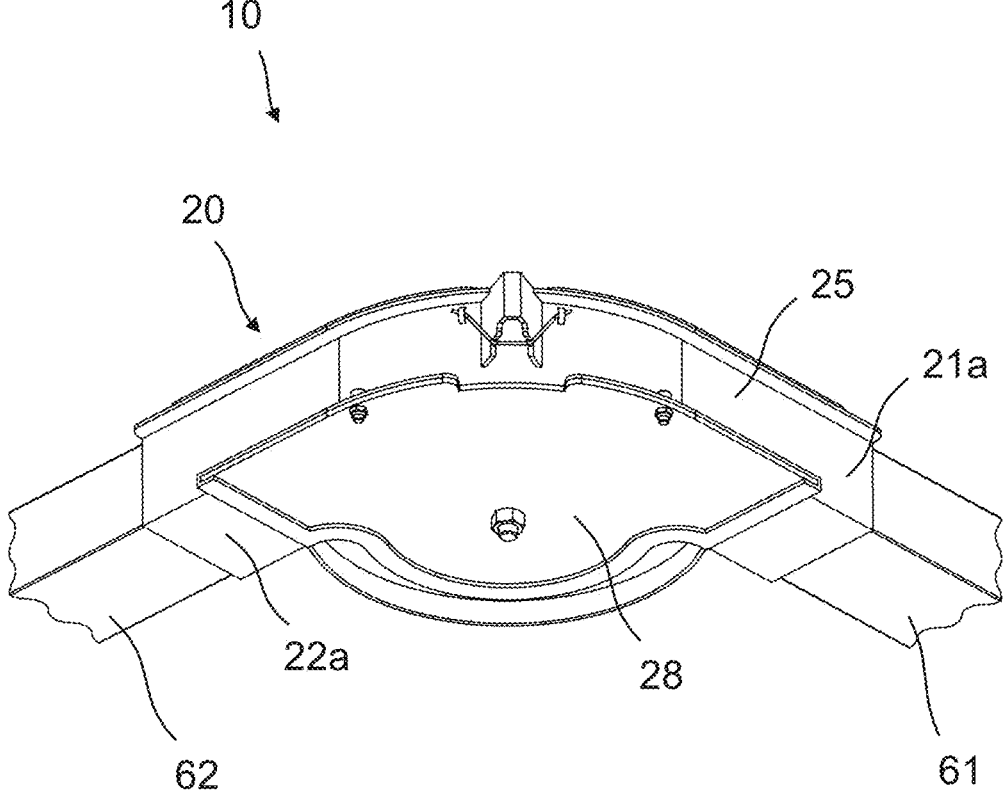
FIG. 3 is a perspective view from inclined below of a device for deflecting a conveyor chain.

FIG. 3 shows a perspective view from inclined below of the device 10 shown in FIG. 1 for deflecting a conveyor chain. A base plate 28 is arranged on the lower section of the housing 20, which is detachably connected to the housing body 25 by means of a screw connection.

Figure 4:
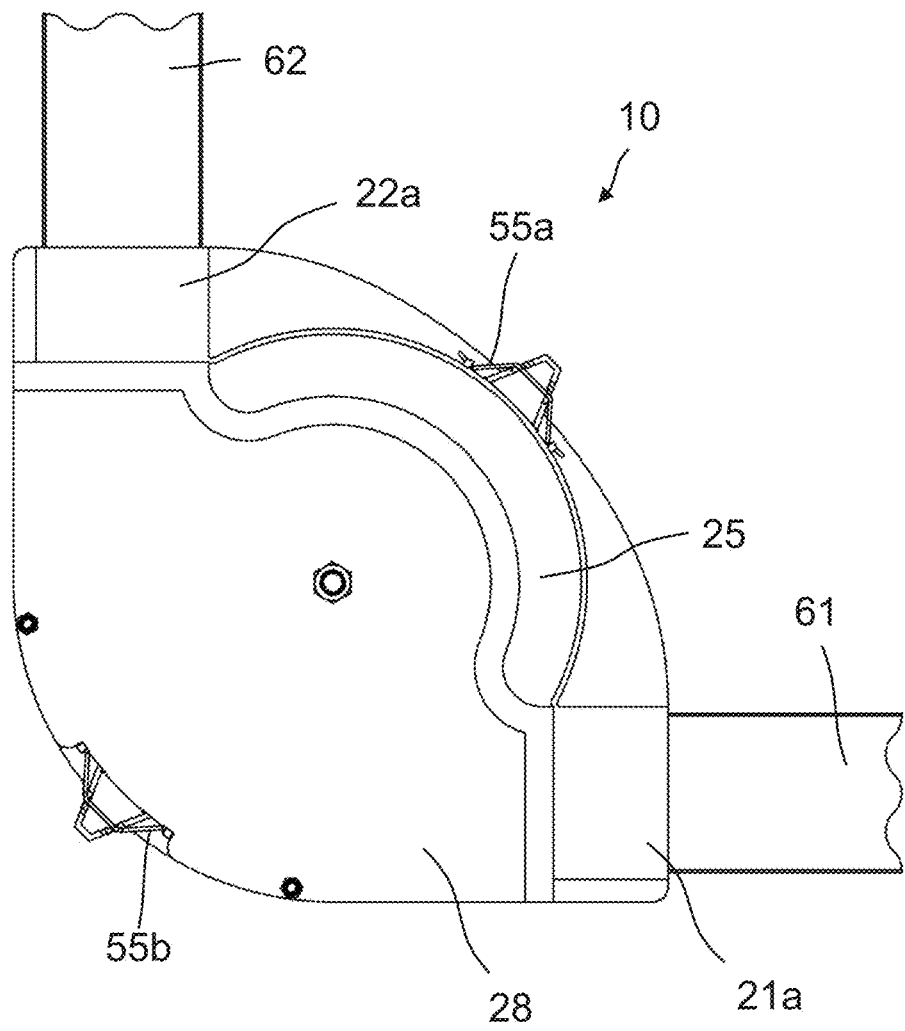
FIG. 4 is a view from below of a device for deflecting a conveyor chain.

FIG. 4 shows a view from below of the device 10 shown in FIG. 1 for deflecting a conveyor chain. In this view, it can be seen that the device 10 has two wire brackets 55*a*, 55*b*, which are connected and/or connectable to the housing 20. These wire brackets 55*a*, 55*b* are provided to fix the housing 20 to a device holding arrangement.

Figure 5:
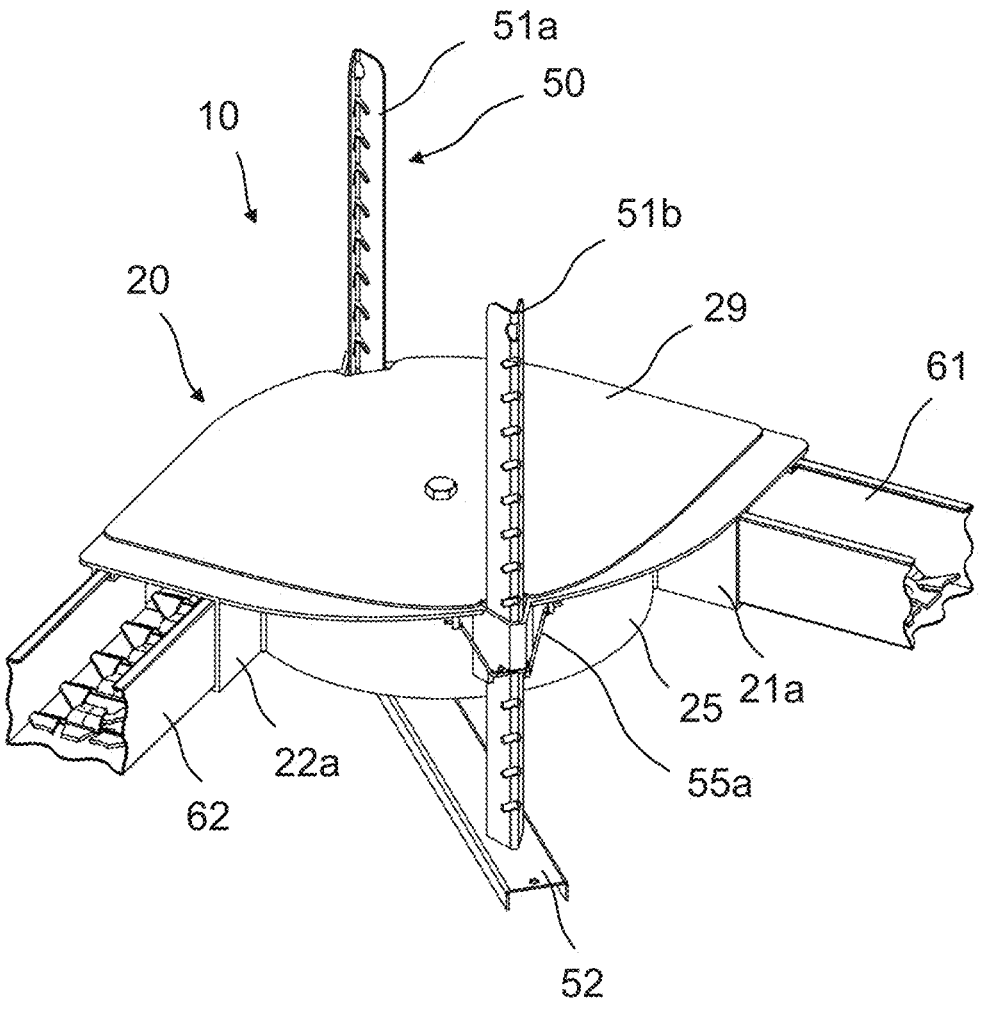
FIG. 5 is a perspective view from inclined above of a device for deflecting a conveyor chain.

FIG. 5 shows a perspective view from inclined above of the device 10 shown in FIG. 1 for deflecting a conveyor chain 90. In this view, however, in contrast to the view shown in FIG. 1, a cover 29, which is detachably connected to the housing body 25, is shown. Furthermore, a device holding arrangement 50 is shown in FIG. 5, which has two stands 51*a*, 51*b* and a foot element 52 connected to the stands 51a, 51b. The housing 20 is connected to the device holding arrangement 50 by means of the two wire brackets 55a, 55b.

Figure 6:
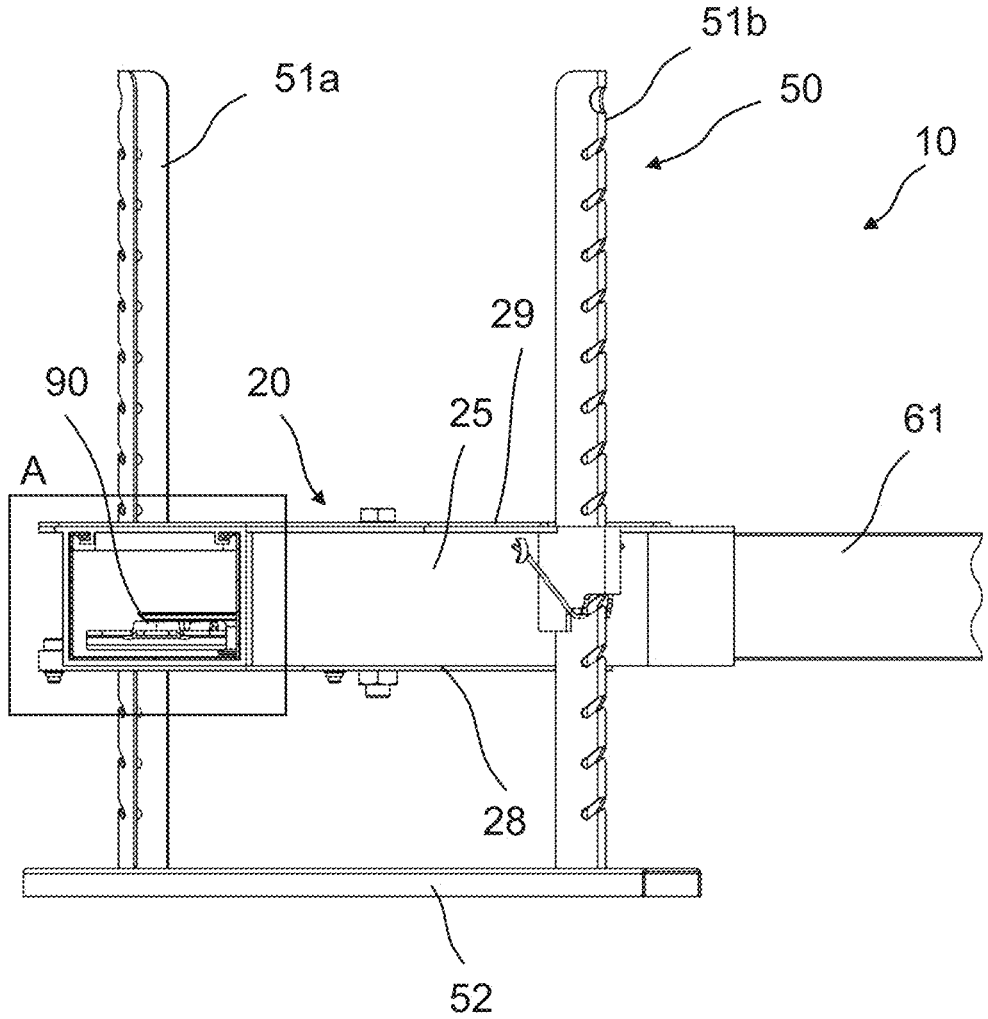
FIG. 6 is a side view of a device for deflecting a conveyor chain.

FIG. 6 shows a side view of the device 10 shown in FIG. 5 for deflecting a conveyor chain 90.

Figure 7:
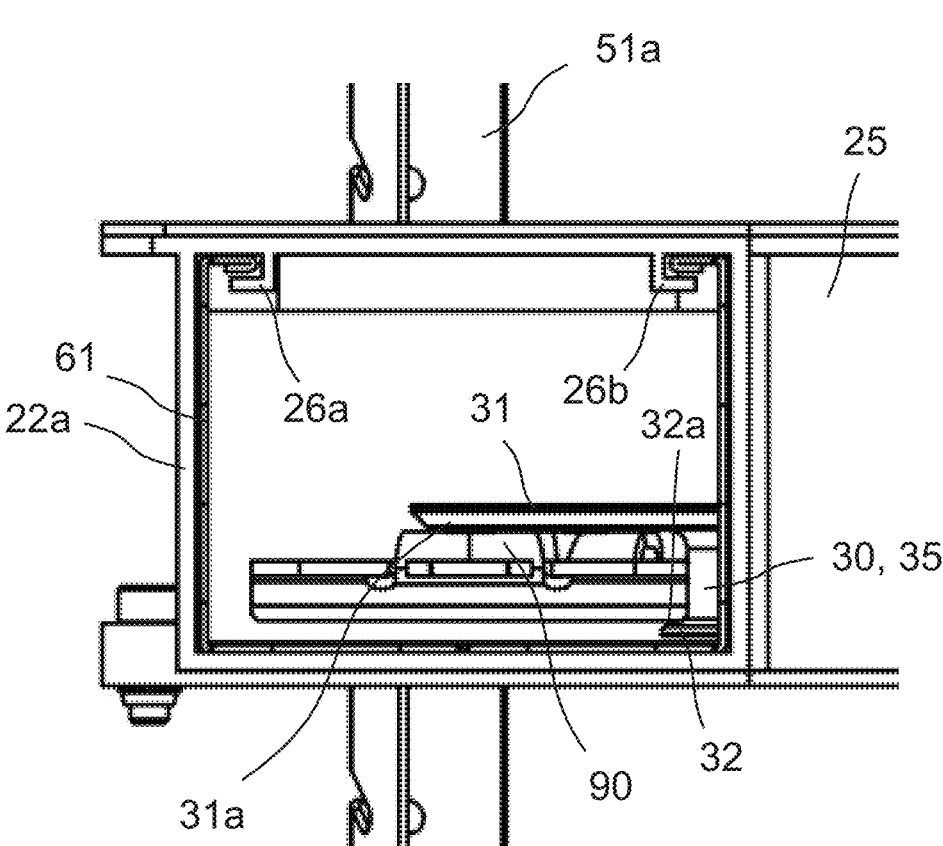
FIG. 7 is a detailed view of the view shown in FIG. 6.

FIG. 7 shows a detailed view A from the view shown in FIG. 6. The radially outer section of the deflection wheel 30 can be seen in this view. The deflection wheel 30 has a first conveyor chain guide element 31, which extends radially outwards from an outer circumference 35 of the deflection wheel 30. The first conveyor chain guide element 31 has a first conveyor chain guide section 31a.

The deflection wheel 30 also has a second conveyor chain guide element 32, which also extends radially outwards from the outer circumference 35 of the deflection wheel 30. The second conveyor chain guide element 32 has a second conveyor chain guide section 32a.

The conveyor chain 90 is arranged between the first conveyor chain guide element 31 and the second conveyor chain guide element 32 in such a way that the conveyor chain 90 is only guided and deflected within the housing 20 by the deflection wheel 30 and is not in contact with other components of the housing 20.

Figure 8:
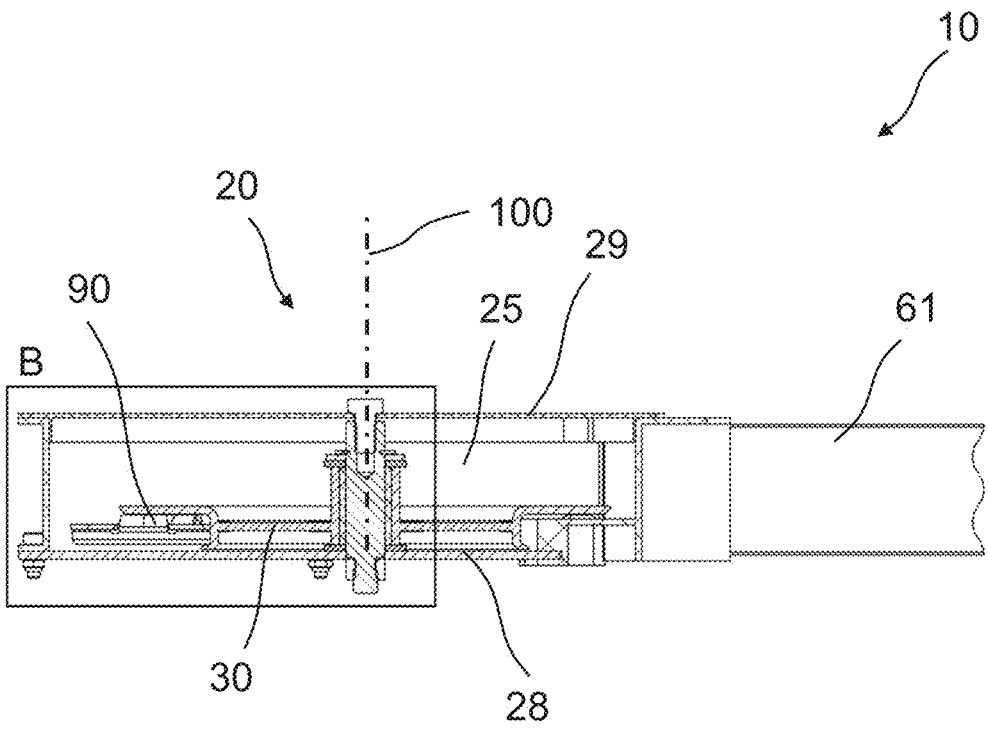
FIG. 8 is a sectional view of a device for deflecting a conveyor chain.

FIG. 8 shows a sectional view of a device 10 for deflecting a conveyor chain 90. The device 10 has a housing 20 with a housing body 25 as well as a cover 29 and a base plate 28. A deflection wheel 30 is arranged rotatably about an axis of rotation 100 within the housing 20. The deflection wheel 30 is rotationally symmetrical.

Figure 9:
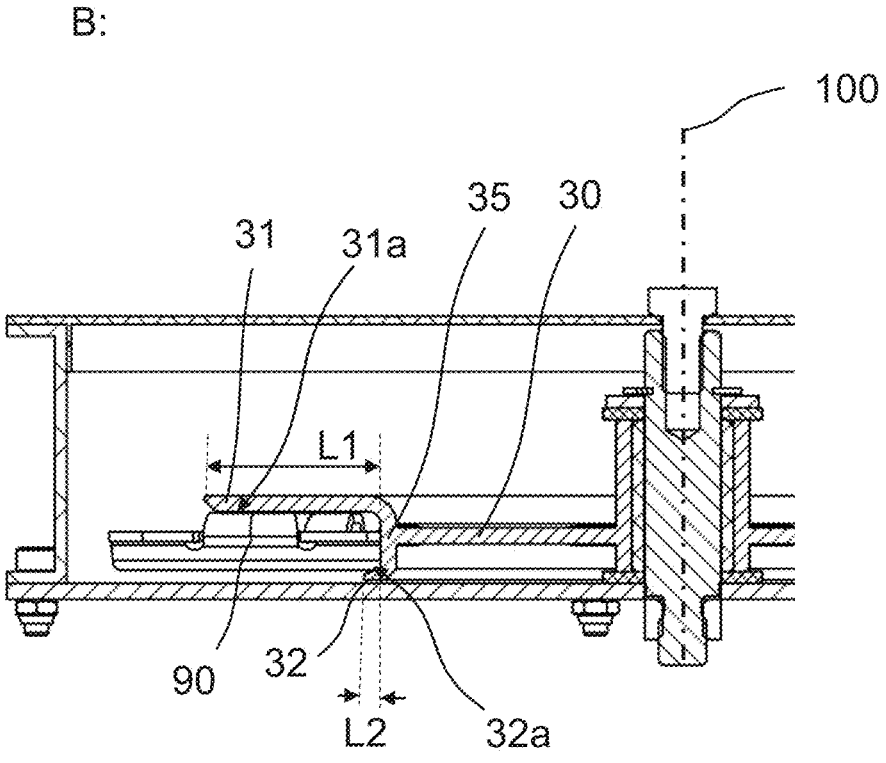
FIG. 9 is a detailed view of the view shown in FIG. 8.

FIG. 9 shows a detailed view B from the view shown in FIG. 8. The deflection wheel 30 has a first conveyor chain guide element 31, which extends radially outwards from an outer circumference 35 of the deflection wheel 30. The first conveyor chain guide element 31 has a first conveyor chain guide section 31a, which is arranged on the underside of the first conveyor chain guide element 31.

The deflection wheel 30 also has a second conveyor chain guide element 32, which also extends radially outwards from the outer circumference 35 of the deflection wheel 30. The second conveyor chain guide element 32 has a second conveyor chain guide section 32a, which is arranged on the upper side of the second conveyor chain guide element 32.

The extension L1 of the first conveyor chain guide element 31 in the radially outward direction is many times greater, in the embodiment shown here more than four times greater, than the extension L2 of the second conveyor chain guide element 32 in the radially outward direction.

The conveyor chain 90 is arranged between the first conveyor chain guide element 31 and the second conveyor chain guide element 32, in particular between the first conveyor chain guide section 31a and the second conveyor chain guide section 32a, in such a way that the conveyor chain 90 is only guided and deflected within the housing 20 by the deflection wheel 30 and is not in contact with other components of the housing 20.

Figure 10:
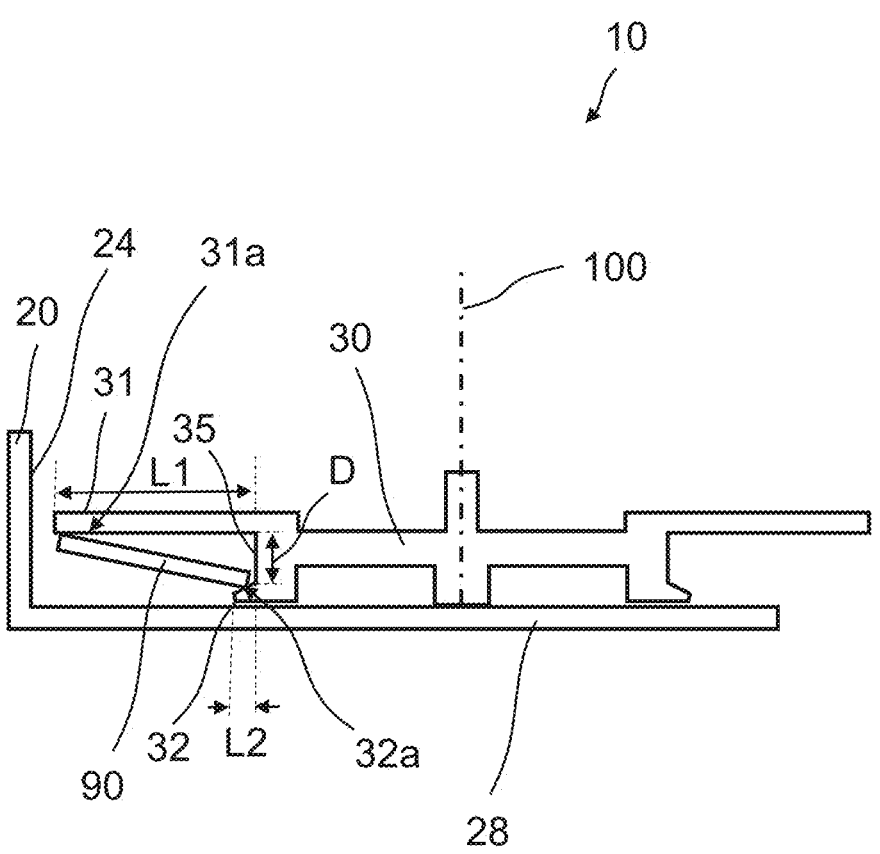
FIG. 10 is a highly schematic sectional view of a device for deflecting a conveyor chain.

FIG. 10 shows a highly schematic sectional view of a device 10 for deflecting a conveyor chain 90. Only schematic parts of the housing 20 are shown, including the base plate 28 and the inner surface 24 of the housing body 25. The deflection wheel 30 has a first conveyor chain guide element 31, which extends radially outwards from an outer circumference 35 of the deflection wheel 30. The first conveyor chain guide element 31 has a first conveyor chain guide section 31a, which is arranged on the underside of the first conveyor chain guide element 31.

The deflection wheel 30 also has a second conveyor chain guide element 32, which also extends radially outwards from the outer circumference 35 of the deflection wheel 30. The second conveyor chain guide element 32 has a second conveyor chain guide section 32a, which is arranged on the upper side of the second conveyor chain guide element 32.

The extension L1 of the first conveyor chain guide element 31 in the radially outward direction is many times greater, in the embodiment shown here more than four times greater, than the extension L2 of the second conveyor chain guide element 32 in the radially outward direction.

The first conveyor chain guide element 31 and the second conveyor chain guide element 32 extend in a horizontal direction and are spaced apart from each other by a distance D in a vertical direction.

Figure 11:
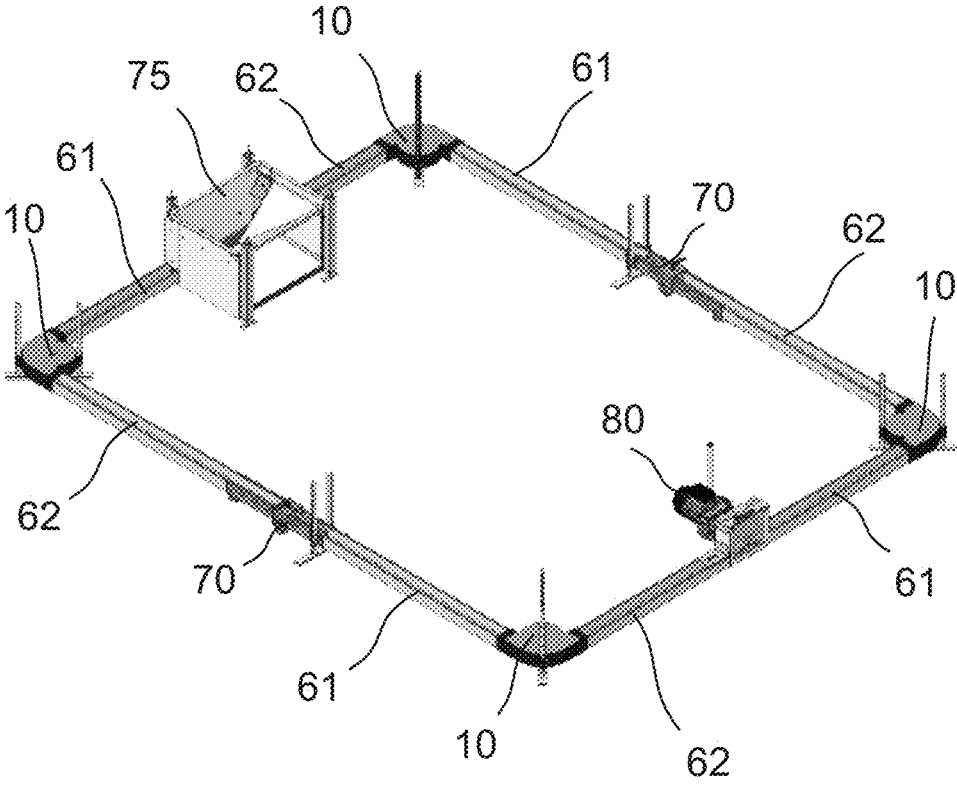
FIG. 11 is a perspective view of an animal feed transport system.

FIG. 11 shows a perspective view of an animal feed transport system. The animal feed transport system has four devices 10. An endless conveyor chain extends between these devices 10. A plurality of feeding troughs 61, 62 are provided between the devices 10, which serve to provide the feed for the animals. The feeding troughs 61, 62 are designed in the form of a U-profile.

Furthermore, an electric drive unit 80 is provided for driving the conveyor chain, wherein the drive unit 80 is designed to move the conveyor chain at a speed of 12 to 18 m/min or at a speed of 36 m/min, for example.

In addition, two chain tensioning devices 70 are provided for tensioning the conveyor chain, wherein the chain tensioning devices 70 are each arranged between two feeding troughs 61, 62 and are designed to push the feeding troughs 61, 62 apart and thereby tension the conveyor chain 90.

Furthermore, a feed container 75 is provided, wherein the conveyor chain for receiving animal feed from the feed container 75 extends through the feed container 75.

Figure 12:
FIG. 12 is a schematic representation of a method for deflecting a conveyor chain.
Figure 12:
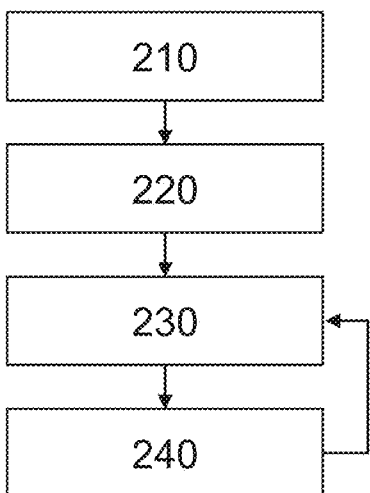

FIG. 12 shows a schematic representation of a method 200 for deflecting a conveyor chain, in particular for transporting animal feed. The method comprises the following steps:

In a step 210, providing a device 10 for deflecting a conveyor chain 90, the device 10 comprising a housing 20 with a first housing opening 21 and a second housing opening 22, and a deflection wheel 30, wherein the deflection wheel 30 is arranged within the housing 20 between the first housing opening 21 and the second housing opening 22, and wherein the deflection wheel 30 is mounted rotatably about a, preferably vertical, axis of rotation 100, wherein the deflection wheel 30 has a first conveyor chain guide element 31 which has a first conveyor chain guide section 31a, and wherein the deflection wheel 30 has a second conveyor chain guide element 32 which has a second conveyor chain guide section 32a.

In a step 220, arranging a conveyor chain 90, preferably comprising a plurality of interconnected chain links 91, 92, so that the conveyor chain 90 extends from the first housing opening 21 to the second housing opening 22, wherein the conveyor chain 90 is arranged along the deflection wheel 30 at least in sections between the first conveyor chain element 31 and the second conveyor chain element 32, and in particular between the first conveyor chain guide section 31a and the second conveyor chain guide section 32a.

In a step 230, moving the conveyor chain 90 by means of a drive unit 80 at a speed of at least 10 m/min, preferably at least 12 m/min, and of at most 40 m/min, preferably at most 38 m/min. Preferably, the conveyor chain 90 is moved at a speed in the range from 12 m/min to 18 m/min or at a speed of 36 m/min. The conveyor chain 90 is moved for a maximum of 75 minutes per day, preferably for a maximum of 20 minutes per day, particularly preferably for a maximum of 15 minutes per day.

In a step 240, stopping 240 the conveyor chain 90 by stopping the drive unit 80. Steps 230 and 240 are then carried out continuously and alternately one after the other.

The invention claimed is:

1. A device for deflecting a conveyor chain for transporting animal feed, the device comprising:
   a housing with a first housing opening and a second housing opening; and
   a deflection wheel adapted to guide and deflect the conveyor chain from the first housing opening of the housing to the second housing opening of the housing, wherein the deflection wheel is arranged within the housing between the first housing opening and the second housing opening, and wherein the deflection wheel is mounted rotatably about an axis of rotation;
   wherein the deflection wheel has a first conveyor chain guide element extending radially outwards from an outer circumference of the deflection wheel, wherein the first conveyor chain guide element has a first conveyor chain guide section; and
   the deflection wheel has a second conveyor chain guide element extending radially outwards from the outer circumference of the deflection wheel, wherein the second conveyor chain guide element has a second conveyor chain guide section;
   wherein the first conveyor chain guide element and the second conveyor chain guide element are arranged at a predetermined distance from one another in the direction of the axis of rotation; and
   wherein the extension of the first conveyor chain guide element in the radially outward direction is at least four times greater than the extension of the second conveyor chain guide element in the radially outward direction.

2. The device according to claim 1, wherein the first housing opening and the second housing opening are arranged rotated relative to each other with respect to the axis of rotation by at least 75° and at most 150°.

3. The device according to claim 1, wherein
   the distance in the vertical direction between the lower side of the first conveyor chain guide element and the upper side of the second conveyor chain guide element is at least 22 mm.

4. The device according to claim 1, wherein the first conveyor chain guide element extends radially outwards from the outer circumference of the deflection wheel parallel to a radial direction which is aligned orthogonally to the axis of rotation; and
   wherein the second conveyor chain guide element extends radially outwards from the outer circumference of the deflection wheel parallel to a radial direction which is aligned orthogonally to the axis of rotation.

5. The device according to claim 1, wherein the first conveyor chain guide section is arranged on an underside of the first conveyor chain guide element;
   wherein the second conveyor chain guide section is arranged on an upper side of the second conveyor chain guide element; and
   wherein the first conveyor chain guide section and the second conveyor chain guide section are arranged facing each other.

6. The device according to claim 1, wherein the first conveyor chain guide element extends further radially outwards than the second conveyor chain guide element;
   wherein the extension of the first conveyor chain guide element in the radially outward direction is at least 34 mm or at most 50 mm; and wherein the extension of the second conveyor chain guide element in the radially outward direction is at least 3 mm and/or at most 8 mm.

7. The device according to claim 1, wherein the first conveyor chain guide section and the second conveyor chain guide section are formed and adapted to receive the conveyor chain between the first conveyor chain guide section and the second conveyor chain guide section.

8. The device according to claim 1, wherein the housing has a housing body comprising a thermoplastic polymer and designed as a plastic injection-molded component; and
   wherein the housing comprises a base plate detachably connected to the housing body and which comprises or consists of steel having a hardness according to EN ISO 6506-1 of less than 400 HBW.

9. The device according to claim 8, wherein no chain guide rail is arranged on the inner surface of the housing body.

10. The device according to claim 8, wherein the housing in the region of the first housing opening has at least one feed trough guide element formed integrally with the housing body for guiding a feed trough; and
   wherein the housing in the region of the second housing opening has at least one feed trough guide element formed integrally with the housing body for guiding the feed trough.

11. The device according to claim 10, wherein the at least one feed trough guide element arranged in the region of the first housing opening is configured as at least one projection projecting into the first housing opening with an L-shaped cross section; and
   wherein the at least one feed trough guide element arranged in the region of the second housing opening is configured as at least one projection projecting into the second housing opening with an L-shaped cross section.

12. The device according to claim 1, further comprising:
   a device holding arrangement, comprising at least one stand and a foot element connected to the at least one stand; and
   at least one wire bracket connected to the housing and designed to fix the device to the at least one stand of the device holding arrangement.

13. An animal feed transport system for transporting animal feed, comprising:
   at least one device according claim 1; and
   the conveyor chain comprising a plurality of interconnected chain links, wherein the conveyor chain extends through the at least one device;
   wherein the conveyor chain is arranged at least in sections between the first conveyor chain element and the second conveyor chain element and between the first conveyor chain guide section and the second conveyor chain guide section.

14. The animal feed transport system according to claim 13, further comprising:
   at least one feed trough in the form of a U-profile connected to the at least one device; and
   a drive unit for driving the conveyor chain, wherein the drive unit is adapted to move the conveyor chain at a speed of at least 10 m/min and at a speed of at most 40 m/min.

15. The animal feed transport system according to claim 13, further comprising:
   at least one chain tensioning device for tensioning the conveyor chain; and a feed container, wherein the conveyor chain for receiving animal feed from the feed container extends through the feed container.

16. The animal feed transport system according to claim 14, wherein the at least one feed trough is directly connected to the housing; and wherein the at least one feed trough is insertable into the housing in a region of the first housing opening and/or the second housing opening.

17. A method for deflecting a conveyor chain for transporting animal feed, the method comprising:

providing a device for deflecting the conveyor chain comprising:

a housing with a first housing opening and a second housing opening; and a deflection wheel adapted to guide and deflect a conveyor chain from the first housing opening of the housing to the second housing opening of the housing, wherein the deflection wheel is arranged within the housing between the first housing opening and the second housing opening, and wherein the deflection wheel is mounted rotatably about a vertical axis of rotation;

wherein the deflection wheel has a first conveyor chain guide element which has a first conveyor chain guide section;

wherein the deflection wheel has a second conveyor chain guide element which has a second conveyor chain guide section;

wherein the first conveyor chain guide element and the second conveyor chain guide element are arranged at a predetermined distance from one another in the direction of the axis of rotation; and wherein the extension of the first conveyor chain guide element in the radially outward direction is at least four times greater than the extension of the second conveyor chain guide element in the radially outward direction;

arranging the conveyor chain comprising a plurality of interconnected chain links within the housing so that the conveyor chain extends from the first housing opening to the second housing opening, wherein the conveyor chain is arranged along the deflection wheel at least in sections between the first conveyor chain element and the second conveyor chain element, and in between the first conveyor chain guide section and the second conveyor chain guide section; and moving the conveyor chain by means of a drive unit at a speed of at least 10 m/min and of at most 40 m/min.

18. The method according to claim 17, wherein the conveyor chain is only in direct contact with the deflection wheel when the conveyor chain is moved within the device and the conveyor chain is not in direct contact with other parts of the device.

19. Use of the device according to claim 1 in a barn for breeding animals and for transporting animal feed in the barn.

20. A device for deflecting a conveyor chain for transporting animal feed, the device comprising:

a housing with a first housing opening and a second housing opening; and a deflection wheel adapted to guide and deflect a conveyor chain from the first housing opening of the housing to the second housing opening of the housing, wherein the deflection wheel is arranged within the housing between the first housing opening and the second housing opening, and wherein the deflection wheel is mounted rotatably about a vertical axis of rotation;

wherein the deflection wheel has a first conveyor chain guide element extending radially outwards from an outer circumference of the deflection wheel, wherein the first conveyor chain guide element has a first conveyor chain guide section, such that the first conveyor chain guide section is arranged on an underside of the first conveyor chain guide element;

wherein the deflection wheel has a second conveyor chain guide element extending radially outwards from the outer circumference of the deflection wheel, wherein the second conveyor chain guide element has a second conveyor chain guide section, such that the second conveyor chain guide section is arranged on an upper side of the second conveyor chain guide element;

wherein the first conveyor chain guide element and the second conveyor chain guide element are arranged at a predetermined distance from one another in the direction of the axis of rotation;

wherein the extension of the first conveyor chain guide element in the radially outward direction is at least four times greater than the extension of the second conveyor chain guide element in the radially outward direction; and wherein the conveyor chain comprises a plurality of interconnected chain links and extends through the device and is disposed between the underside of the first conveyor chain guide element and the upper side of the second conveyor chain guide element.

* * * * *